(12) United States Patent  
Guo et al.

(10) Patent No.: US 9,742,645 B2  
(45) Date of Patent: *Aug. 22, 2017

(54) METHOD AND APPARATUS FOR MEASURING PERFORMANCE OF MULTI-SERVICE IN TUNNEL

(71) Applicant: Huawei Technologies Co., Ltd., Shenzhen (CN)

(72) Inventors: Xinchun Guo, Shenzhen (CN); Guoyi Chen, Beijing (CN); Jian Li, Beijing (CN); Wei Cao, Beijing (CN); Li Xue, Shenzhen (CN); Jihong Mei, Shenzhen (CN); Zhanbin Wang, Langfang (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/830,381

(22) Filed: Aug. 19, 2015

(65) Prior Publication Data

US 2015/0358221 A1    Dec. 10, 2015

Related U.S. Application Data

(63) Continuation of application No. 13/691,342, filed on Nov. 30, 2012, now Pat. No. 9,143,425, which is a
(Continued)

(51) Int. Cl.
*H04L 12/26* (2006.01)
*H04L 12/741* (2013.01)
(Continued)

(52) U.S. Cl.
CPC .......... *H04L 43/08* (2013.01); *H04L 12/4633* (2013.01); *H04L 41/5009* (2013.01);
(Continued)

(58) Field of Classification Search
CPC ..... H04L 43/08; H04L 12/4633; H04L 45/26; H04L 45/74; H04L 41/5009; H04L 43/0858; H04L 43/0864; H04L 43/087
(Continued)

(56) References Cited

U.S. PATENT DOCUMENTS 6,868,094 B1   3/2005   Bordonaro et al.
7,092,410 B2   8/2006   Bordonaro et al.
(Continued)

FOREIGN PATENT DOCUMENTS

CN      1783807 A       6/2006
CN    101001115 A       7/2007
(Continued)

OTHER PUBLICATIONS

Frost, D. et al., "Packet Loss and Delay Measurement for MPLS Networks: draft-frost-mpls-delay-00," MPLS Internet-Draft, Cisco Systems, Dec. 2010, 39 pages.
(Continued)

*Primary Examiner* — Faisal Choudhury
(74) *Attorney, Agent, or Firm* — Brinks, Gilson & Lione

(57) ABSTRACT

Embodiments of the present application provide a method for measuring performance of multi-service in a tunnel, including: receiving a measurement message corresponding to a service packet, where a priority of the measurement message is the same as that of the service packet, and the measurement message includes at least one of the three: a packet loss measurement parameter, a delay measurement parameter, and a jitter measurement parameter; and measuring performance of a service in a tunnel according to a measurement parameter in the measurement message. According to the embodiments of the present application, a
(Continued)

problem that performance measurement cannot be performed for different services transmitted in a tunnel in the prior art may be solved.

10 Claims, 4 Drawing Sheets

Related U.S. Application Data continuation of application No. PCT/CN2009/073659, filed on Sep. 1, 2009.

(51) Int. Cl.
*H04L 12/24* (2006.01)
*H04L 12/46* (2006.01)
*H04L 12/721* (2013.01)

(52) U.S. Cl.
CPC ...... *H04L 43/0829* (2013.01); *H04L 43/0852* (2013.01); *H04L 43/10* (2013.01); *H04L 43/50* (2013.01); *H04L 45/26* (2013.01); *H04L 45/70* (2013.01); *H04L 45/74* (2013.01); *H04L 43/087* (2013.01); *H04L 43/0835* (2013.01); *H04L 43/0858* (2013.01); *H04L 43/0864* (2013.01)

(58) Field of Classification Search
USPC .......................................... 370/252
See application file for complete search history.

(56) References Cited

U.S. PATENT DOCUMENTS

| | | |
|---|---|---|
| 7,154,858 B1 | 12/2006 | Zhang et al. |
| 7,792,083 B2 | 9/2010 | Bordonaro et al. |
| 2005/0094567 A1* | 5/2005 | Kannan ............... H04L 41/5009 370/241 |
| 2005/0129059 A1* | 6/2005 | Jiang ................... H04L 12/437 370/466 |
| 2006/0233175 A1* | 10/2006 | Ge ........................ H04L 45/04 370/392 |
| 2007/0076605 A1 | 4/2007 | Cidon et al. |
| 2007/0097945 A1* | 5/2007 | Wang ..................... H04L 45/12 370/349 |
| 2007/0171910 A1* | 7/2007 | Kumar ................ H04L 63/0428 370/392 |
| 2007/0263606 A1* | 11/2007 | Devereux ............... H04L 12/66 370/356 |
| 2008/0020775 A1 | 1/2008 | Willars |
| 2008/0171547 A1 | 7/2008 | Moon et al. |
| 2008/0279108 A1 | 11/2008 | Beziot et al. |
| 2008/0318630 A1 | 12/2008 | Gil |
| 2009/0180485 A1 | 7/2009 | Bergmann et al. |
| 2011/0182231 A1 | 7/2011 | Wang et al. |
| 2012/0014245 A1* | 1/2012 | Park ...................... H04L 1/1832 370/216 |
| 2013/0088994 A1 | 4/2013 | Guo et al. |

FOREIGN PATENT DOCUMENTS

| | | |
|---|---|---|
| CN | 101039206 A | 9/2007 |
| CN | 101150763 A | 3/2008 |
| CN | 101321092 A | 12/2008 |
| CN | 102273136 A | 12/2011 |
| EP | 1 995 938 A | 11/2008 |

OTHER PUBLICATIONS

Frost, D. et al., "Packet Loss and Delay Measurement for MPLS Networks: draft-ietf-mpls-loss-delay-04," MPLS Internet-Draft, Cisco Systems, Jul. 2011, 52 pages.

Frost, D. et al.,"Packet Loss and Delay Measurement for MPLS Networks," Internet Engineering Task Force, Cisco Systems, Sep. 2011, 52 pages.

ITU-T, "OAM Functions and Mechanisms for Ethernet based networks" Series Y: Global Information Infrastructure, Internet Protocol Aspects and Next-Generation Networks Y.1731, May 2006, 160 pages.

ITU-T, "OAM Functions and Mechanisms for Ethernet based networks" Series Y: Global Information Infrastructure, Internet Protocol Aspects and Next-Generation Networks Y.1731, Feb. 2008, 82 pages.

\* cited by examiner

| Type (PL TLV) | Length |
|---|---|
| Tunnel number ||
| CT7 CT6 CT5 CT4 CT3 CT2 CT1 CT0 / DTI / Reserved |||
| Packet loss measurement period of CTx ||

FIG. 3

| Type (PM TLV) | Length |
|---|---|
| Tunnel number ||
| CT7 CT6 CT5 CT4 CT3 CT2 CT1 CT0 / DTI / Reserved |||
| Packet loss measurement period of CTx ||
| Delay measurement period of CTx ||

FIG. 4

| Type (PM TLV) | Length |
|---|---|
| Tunnel number ||
| Packet loss measurement period ||
| Delay mesurement period ||

# METHOD AND APPARATUS FOR MEASURING PERFORMANCE OF MULTI-SERVICE IN TUNNEL

CROSS-REFERENCE TO RELATED APPLICATIONS

This application is a Continuation of U.S. application Ser. No. 13/691,342, filed on Nov. 30, 2012, which is a Continuation of International Application No. PCT/CN2009/073659, filed on Sep. 1, 2009, both of which are hereby incorporated by reference in their entireties.

TECHNICAL FIELD

The present application relates to the field of network communications technologies, and in particular to a method and an apparatus for measuring performance of multi-service in a tunnel.

BACKGROUND

In the field of communications, a tunnel is a transmission channel for bearing a service. One tunnel can bear multiple types of services (Class Type, CT), and different CTs are differentiated by using different priorities. Therefore, the tunnel can provide transmission services of different priorities for services that have different requirements of quality of service (Quality of Service, QOS), so that a network resource is fully utilized according to a user requirement.

A traffic engineering (Traffic Engineering, TE) tunnel, Internet protocol (Internet Protocol, IP) tunnel, label switched path (Label Switched Path, LSP) tunnel and so on can support simultaneous transmission of multiple services of different CTs (which may be referred to as different services), and a service class of a different service may be identified by using a priority identification field, where the priority identification field is generally used as a flag of a QOS service level.

With the constant development of a network and service, QOS of a service has become a hot topic of network research, and how to provide reliable and guaranteed service is a problem commonly concerned by operators. Performance parameters such as packet loss, delay, and jitter, which are used for measuring a service level of a service, are increasingly concerned by equipment suppliers and operators; however, performance parameters such as packet loss, delay, and jitter still cannot be measured for different services transmitted in a same tunnel in the conventional technology.

SUMMARY

An embodiment of the present application provides a method and an apparatus for measuring performance of multi-service in a tunnel, so that performance for different services transmitted in a same tunnel can be measured.

An embodiment of the present application provides a method for measuring performance of multi-service in a tunnel, where the method includes: receiving a measurement message corresponding to a service packet, where a priority of the measurement message is the same as a priority of the service packet corresponding to the measurement message, the measurement message includes a measurement parameter, and the measurement parameter includes at least one of the three: a packet loss measurement parameter, a delay measurement parameter, and a jitter measurement parameter; and measuring performance of a service in the tunnel according to the measurement parameter in the measurement message.

An embodiment of the present application further provides an apparatus for measuring performance of multi-service in a tunnel, where the apparatus includes: a measurement message receiving unit, configured to receive a measurement message corresponding to a service packet, where a priority of the measurement message is the same as a priority of the service packet corresponding to the measurement message, the measurement message includes a measurement parameter, and the measurement parameter includes at least one of the three: a packet loss measurement parameter, a delay measurement parameter, and a jitter measurement parameter; and a service performance measuring unit, configured to measure performance of a service in the tunnel according to the measurement parameter in the measurement message.

According to the embodiments of the present application, a priority of a measurement message is set to a priority of a corresponding service packet, and at least one parameter of the three: a packet loss measurement parameter, a delay measurement parameter, and a jitter measurement parameter is added to the measurement message to measure performance of a service transmitted in a tunnel, so that performance measurement may be performed for different services transmitted in a same tunnel.

BRIEF DESCRIPTION OF THE DRAWINGS

The accompanying drawings described herein are provided for further understanding of the present application, which are part of the application, but are not intended to limit the present application. In the drawings:

FIG. 3 is a format diagram of an extended TLV according to Embodiment 2;

FIG. 4 is a format diagram of an extended TLV according to Embodiment 2;

DETAILED DESCRIPTION

To make the objectives, technical solutions, and advantages of the present application more comprehensible, the following describes the present application in further detail with reference to specific embodiments and accompanying drawings. Herein, the exemplary embodiments of the present application and their descriptions are merely provided for explaining the present application, instead of limiting the present application.

Embodiment 1

Figure 1:
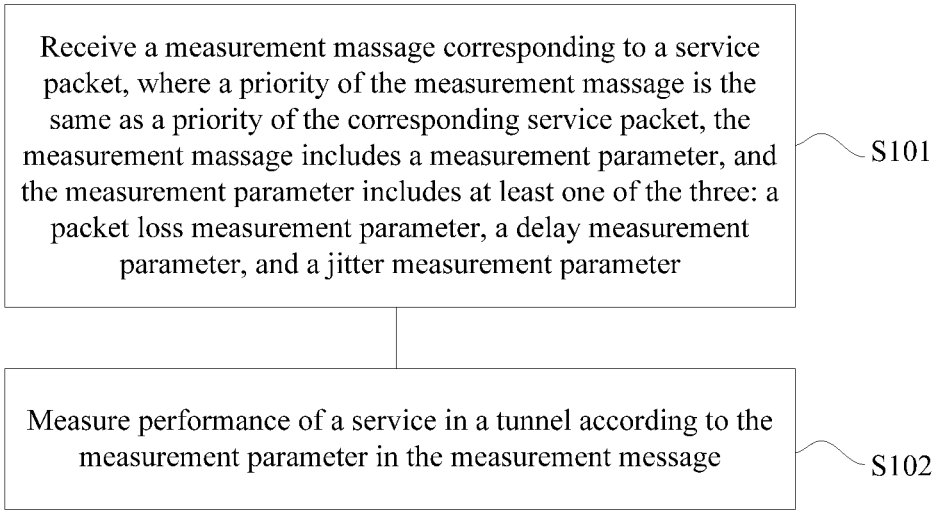
FIG. 1 is a flow chart of a method for measuring performance of multi-service in a tunnel according to Embodiment 1 of the present application.

FIG. 1 is a flow chart of a method for measuring performance of multi-service in a tunnel according to Embodiment 1 of the present application. The method includes:

S101: Receive a measurement message corresponding to a service packet, where a priority of the measurement message is the same as a priority of the service packet corresponding to the measurement message, the measurement message includes a measurement parameter, and the measurement parameter includes at least one of the three parameters: a packet loss measurement parameter, a delay measurement parameter, and a jitter measurement parameter. In the embodiment, the service packet may have multiple different types, which are differentiated based upon their priorities.

S102: Measure performance of a service in the tunnel according to the measurement parameter in the measurement message.

As an embodiment of the present application, the measurement message described herein may be a one-way measurement message from a sending end to a receiving end; alternatively, the measurement message described herein may be a measurement message sent by the sending end that carries request information and a measurement message that carries response information and is returned by the receiving end after receiving the measurement message that carries the request information. Corresponding to the foregoing two different sending manners of the measurement message, manners for measuring performance of a service in the embodiment are also different. One measuring manner is that performance of a service is to be measured at a remote end after the sending end sends a measurement message to the remote end; and another measuring manner is that performance of a service is performed at the sending end after the sending end sends a measurement message. In addition, the measurement message may be differentiated from the service packet based upon a protocol number, a port number, or a label.

What's more, since multiple services are transmitted in a same tunnel, in order to perform measurement and statistic collection on performance of different services, a problem to be solved is that various measurement messages need to be corresponding to the services to be measured. As an embodiment of the present application, the foregoing problem is solved by setting a priority of the measurement message in the tunnel to a priority of a packet of a service that is measured by using the measurement message. In this way, it may be ensured that when a receiving end receives a measurement message, a type of service to be measured by using the measurement packet is identified, and it may also be ensured that a measurement result is scientific. Assuming that a measurement message of a certain service is transmitted with a priority of another service, performance of the service (for example, a delay or jitter) that is finally measured may be inaccurate.

As an embodiment of the present application, a measurement message includes at least one of the three parameters: a packet loss measurement parameter, a delay measurement parameter, and a jitter measurement parameter, so that one or more of the packet loss performance of various services, and delay of various services, and jitter performance of various types of services in a tunnel can be measured.

For example, packet loss measurement is performed to determine the packet loss of the service in a tunnel, by comparing the first number of preset-type packets of a certain service sent by a sending end, with the second number of the preset-type packets received by a receiving end. It should be noted that, the preset-type packets described in the embodiment may include at least one of the following cases:

(1) all packets of a certain service, including all service packets of the service and corresponding measurement messages;
(2) all service packets of a certain service;
(3) a service packet with a specific feature of a certain service, for example, a service packet, the sending time of which falls within 12:00 to 24:00 on May 4, 2009,
(4) a service packet with a specific mark.

Delay measurement is performed to determine the delay of a service in a tunnel corresponding to a measurement message, by calculating a difference between a sending time stamp of a sending end carried in the measurement message, and a receiving time stamp of a receiving end to obtain. Jitter measurement refers to a difference between two delay measurement results. Therefore, a jitter measurement parameter is actually based on a delay measurement parameter. One-way delay measurement depends on clock synchronization, while a jitter does not depend on the clock synchronization. Therefore, the jitter may be calculated in the case that a clock is not synchronized, while in this case, an error on the one-way delay measurement may occur.

According to this embodiment of the present application, a priority of a measurement message is set to a priority of a corresponding service packet, and at least one parameter of the three parameters of: a packet loss measurement parameter, a delay measurement parameter, and a jitter measurement parameter, is added to the measurement message to measure performance of a service transmitted in a tunnel, so that performance of different services transmitted in the same tunnel can be measured.

Embodiment 2

Figure 2:
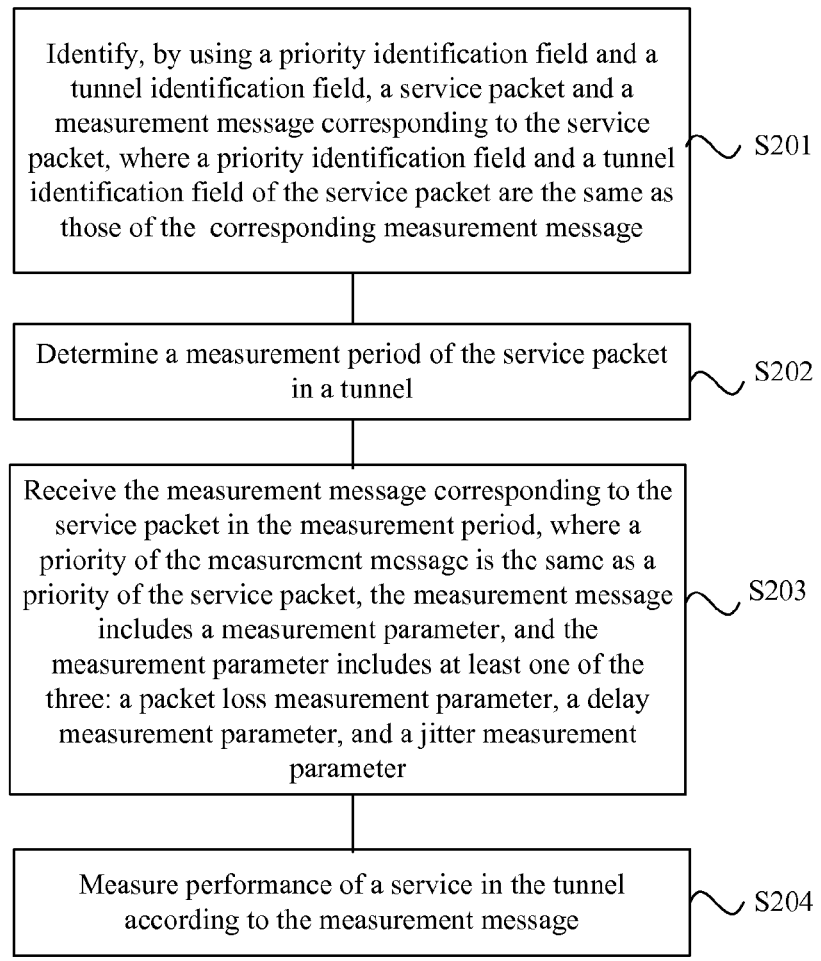
FIG. 2 is a flow chart of a method for measuring performance of multi-service in a tunnel according to Embodiment 2 of the present application.

FIG. 2 is a flow chart of a method for measuring performance of multi-service in a tunnel according to Embodiment 2 of the present application. The method includes:

S201: Identify, by using a priority identification field and a tunnel identification field, a service packet and a measurement message corresponding to the service packet, where a priority identification field and a tunnel identification field of the service packet are the same as those of the corresponding measurement message.

For different services transmitted in different tunnels, in the embodiment, a priority identification field and a tunnel identification field of a packet are used to identify various types of packets in a tunnel so as to differentiate service packets and their measurement messages in the different tunnels. The priority identification field, for example, may be at least one of a traffic class (Traffic Class, TC) field and a differentiated services code point (Differentiated services code point, DSCP) field. Where the TC field is used for a multi-protocol label switching (Multi-Protocol Label Switching, MPLS) tunnel and the DSCP field is used for an IP tunnel. In the embodiment, a TC field and a tunnel number (Tunnel ID) field in an MPLS TE tunnel are taken as an example for description. The TC field is an identification field for identifying the traffic class in an MPLS label format. The TC field is generally used as a flag of a QOS level. In the embodiment, the TC field is also used as a flag of priorities of various types of service packets and a flag of priorities of measurement messages. The TC field may be used to differentiate different service packets and their measurement messages from others in a same TE tunnel. The tunnel ID field is a number of a TE tunnel, and the field in company with the TC field may be used to differentiate service packets and their measurement messages in different TE tunnels.

As an embodiment of the present application, if measurement is only performed on services, the packets belonging to which are transmitted in one same tunnel, the service packets and the measurement messages corresponding to the service packets are identified by using only priority identification fields, where a priority identification field of a service packet is the same as that of the measurement message corresponding to the service packet. In this way, different measurement messages transmitted in the same tunnel may be differentiated.

S202: Determine a measurement period of the service packets in the tunnel. The measurement period is a time period of measurement that is performed automatically by a measurement system on multi-service performance in the tunnel. In the embodiment, there may be two manners for setting the measurement period: One manner is that one end of the tunnel sends a negotiation message a peer end and receives acknowledgement information returned by the peer end to determine measurement periods of various types of services in the tunnel between the two ends; and the other manner is that measurement periods of various types of packets are defined in advance at the two ends. Compared with the second manner, the first negotiation manner is more flexible and convenient, and the first manner is described in detail in the following.

To achieve an objective of negotiating a measurement period, the negotiation message includes an extended type-length-value (Type-Length-Value, TLV) field, where the extended TLV carries information for negotiating a measurement period.

As an embodiment of the present application, a negotiation message may be used to negotiate measurement periods for multiple types of service packets together; alternatively, a negotiation message may be used to negotiate a measurement period for each type of service packet separately. The two cases are described separately in the following.

When a negotiation message is used to negotiate measurement periods for multiple types of service packets together, only one negotiation is needed to complete negotiation of one or more of a packet loss and delay measurement period for the two ends. Referring to FIG. 3, FIG. 3 is a format diagram of an extended packet loss TLV according to Embodiment 2. It can be seen from FIG. 3 that the extended packet loss TLV includes the following fields:

type (Type) field: identifying a type of the TLV, where the type field indicates that the TLV is a packet loss TLV (PL TLV) in the embodiment;

length (Length) field: identifying a length of the packet loss TLV;

tunnel number (Tunnel ID) field: identifying a tunnel to which the packet loss TLV belongs;

CT0-CT7: identifying CTs whose measurement periods are to be negotiated. Each type of service uses one identification bit, and one identification bit is one bit; and when a measurement period of a certain CT is to be negotiated for performance measurement, a CT identification bit corresponding to the certain CT is set to 1, otherwise, the CT identification bit corresponding to the certain CT is set to 0. In the embodiment, there are eight types of services in the tunnel. If measurement periods of CT0, CT4, and CT7 are to be negotiated, CT0-CT7 are set to 10001001 accordingly.

measurement period identification (Detect Time Identifier, DTI) field: This field is used to identify whether measurement periods of various CTs are consistent. If the DTI is set to 1, the measurement periods of the CTs are consistent; and if the DTI is set to 0, it indicates that the measurement periods of the CTs are not consistent (including a case of partial consistency).

reserved (Reserved) field: reserved for future use; and packet loss measurement period field of CTx: used to identify a packet loss measurement period of each CT. If the foregoing DTI field is 1, there is only one measurement period in this field; and if the foregoing DTI field is 0, measurement periods of corresponding CTs are set and arranged from CT0-CT7 sequentially in this field.

A sending end sends a negotiation message that carries the foregoing packet loss TLV to a receiving end. For example, a priority of the negotiation message may be set to be the highest, which may ensure that the negotiation message arrives at the receiving end preferentially. After receiving the negotiation message, the receiving end parses the negotiation message to obtain a CT whose measurement period is to be determined for packet loss performance measurement, and information about a packet loss measurement period corresponding to the CT; then, the receiving end returns acknowledgement information to the sending end. After the sending end receives the acknowledgement information, negotiation of the packet loss measurement period is completed.

Similarly, when a delay measurement period is to be negotiated, the negotiation message may carry a delay TLV, and the negotiation message is transmitted between the two ends to complete negotiation of the delay measurement period. Where a structure of the delay TLV is similar to that of the packet loss TLV. As an embodiment of the present application, a packet loss measurement period and a delay measurement period may also be negotiated by using one negotiation message. In this case, referring to FIG. 4, a delay measurement period field of CTx is placed following a packet loss measurement period field of CTx.

Figures 5, 6:
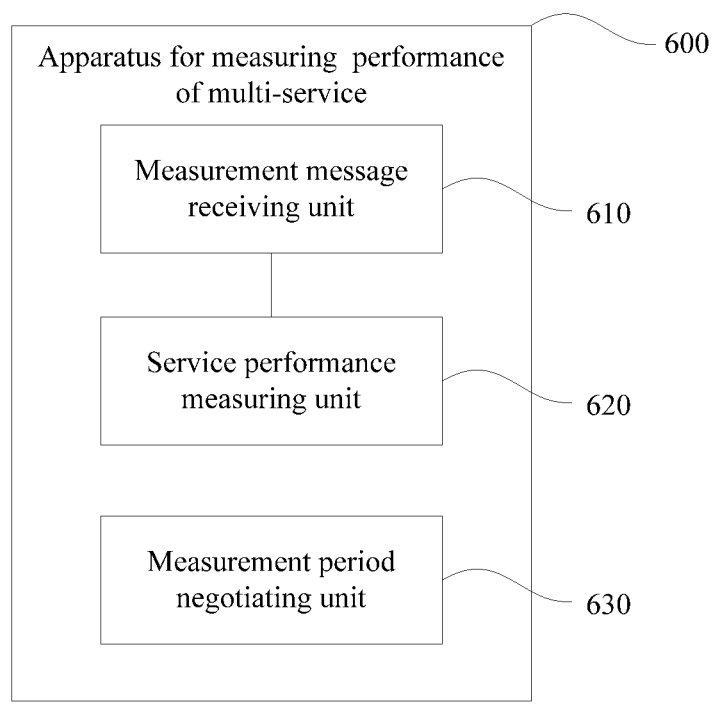
FIG. 5 is a format diagram of another extended TLV according to Embodiment 2.
FIG. 6 is a schematic structural diagram of an apparatus for measuring performance of multi-service according to Embodiment 4 of the present application.

When the negotiation message is used to negotiate a measurement period for each type of service packet separately, the two ends need to perform negotiation for multiple times to complete negotiation of one or more of packet loss measurement periods and delay measurement periods. Referring to FIG. 5, FIG. 5 is a format diagram of another extended packet loss and delay TLV according to Embodiment 2. It can be seen from FIG. 5 that the extended packet loss and delay TLV includes the following fields:

type field: identifying a type of the TLV, where the type field indicates that the TLV is a performance measurement TLV (PM TLV) in this embodiment, that is, including two types of measurement periods: a packet loss measurement period and a delay measurement period;

length field: identifying a length of the TLV;

tunnel number field: identifying a tunnel to which the TLV belongs;

packet loss measurement period field: identifying a period of packet loss measurement of a CT; and delay measurement period field: identifying a period of delay measurement of the CT.

A sending end sends a negotiation message that carries the foregoing performance measurement TLV to a receiving end, and receives returned acknowledgement information so as to complete negotiation of a measurement period. It should be noted that, a measurement period is negotiated for each CT, but a CT to which a service to be measured belongs is not identified in the foregoing performance measurement TLV, and therefore a corresponding CT needs to be identified in a process for transmitting the negotiation message. In this embodiment, identification may also be implemented by adding a field for identifying the corresponding CT to the foregoing performance measurement TLV.

S203: Receive the measurement message in the measurement period, where the measurement message corresponds to the service packet, a priority of the measurement message is the same as a priority of the service packet corresponding to the measurement message. The measurement message includes a measurement parameter, and the measurement parameter includes at least one of the three parameters: a packet loss measurement parameter, a delay measurement parameter, and a jitter measurement parameter.

When the measurement period determined in S202 expires, a sending end sends measurement messages corresponding to CTs. Where the measurement messages carry one or more of packet loss measurement parameters, delay measurement parameters, and jitter measurement parameters. A performance measurement end receives these measurement messages. Where these measurement messages are similar to those in Embodiment 1. These measurement messages not only include a one-way measurement message from the sending end to a receiving end, but also include a measurement message sent by the sending end that carries request information and measurement messages that carries response information and is returned by the receiving end after receiving the measurement message that carries the request information.

S204: Measure performance of various types of services in the tunnel according to the measurement message.

The performance measurement end differentiates various types of service packets and their measurement messages according to priority identification field and tunnel identification field, and measures performance of various types of services, such as packet loss, delay, and jitter, according to performance measurement parameters in the measurement messages; alternatively, the performance measurement end measures performance of various types of services according to performance measurement parameters in the measurement messages and a packet reception situation at the receiving end.

As an embodiment of the present application, a measurement period may be determined to periodically perform performance measurement on various types of service packets; and a measurement period may also not be determined, a measurement message is sent as required, and a measuring end receives the measurement message to perform performance measurement; or a combination of the two are used.

According to this embodiment of the present application, a priority of a measurement message is set to a priority of a service packet corresponding to the measurement message, and the measurement messages and service packets are identified by using a priority identification field and a tunnel identification field, and at least one parameter of the three parameters: a packet loss measurement parameter, a delay measurement parameter, and a jitter measurement parameter in the measurement message is used to measured to perform performance measurement on different services transmitted in a tunnel, so that performance of different services transmitted in the multiple services tunnel can be measured.

Embodiment 3

In this embodiment, an extended bidirectional forwarding detection (Bidirectional Forwarding Detection, BFD) packet is used as a measurement message to further describe Embodiment 2.

BFD is a fast mechanism for detecting a fault, and can fast detect a connectivity of a link, but cannot measure a quality of the link. The inventor extends a BFD packet and adds one or more of a packet loss measurement TLV and delay measurement TLV to the BFD packet, so that a measurement end may measure one or more of a packet loss, delay situation and a jitter situation of a service packet according to one or more of the packet loss measurement TLV and the delay measurement TLV.

Similarly to Embodiment 2, a priority of the extended BFD packet is used as the measurement message, and the priority of the extended BFD packet is the same as a priority of a service packet corresponding to the measurement message. For example, their priority identification fields may be the same. In addition, the extended BFD packet and service packet corresponding to the extended BFD packet also have a same Tunnel ID field, so as to be differentiated from a packet in another tunnel.

The packet loss measurement TLV and delay measurement TLV of the extended BFD packet are described in the following:

A value field of the packet loss measurement TLV includes transmitting count (TxPacketCounter_L), receiving count (RxPacketCounter_L), and returning count (TxPacketCounter_F). Transmitting count is the number of preset-type packets that have been sent when an extended BFD packet is sent. A manner for counting the number of the preset-type packets may be set, as required, to: counting all sent packets, or counting all sent data packets, or counting only packets with a specific feature, or counting only packets the sending time of which is specified. Receiving count is the number of preset-type packets that have been received when an extended BFD packet is received lately. Returning count is a transmitting count carried in an extended BFD packet that is received lately.

Transmitting count is used to calculate packet loss at near-end, Packet Loss [near-end], of a corresponding service packet, and receiving count and returning count are used to calculate packet loss at far-end, Packet Loss [far-end], of the corresponding service packet:

Packet Loss [near-end]=|TxPacketCounter_L[BFD1]−TxPacketCounter_L [BFD2]|−|RxPacketCounterL [BFD1]−RxPacketCounterL [BFD2], where RxPacketCounterL is the number of packets received by a device when an extended BFD packet, BFD1 or BFD2, is received, where the device performs the calculation; and Packet Loss [far-end]=|TxPacketCounter_F [BFD1]−TxPacketCounter_F [BFD2]|−|RxPacketCounter_L [BFD1]−RxPacketCounter_L [BFD2]|.

If the near-end packet loss or far-end packet loss is not to be measured, a corresponding field may be set to 0.

A value field of the delay measurement TLV includes: transmitting time (TxTimeStamp_L), receiving time (RxTimeStamp_L), and returning time (TxTimeStamp_F). Transmitting time is local time when an extended BFD packet is sent; receiving time is local time when an extended BFD packet is received lately; and returning time is transmitting time carried in an extended BFD packet that is received lately.

Transmitting time is used to calculate a one-way delay, Packet Delay [one-way], of a corresponding service packet, and receiving time and returning time are used to calculate a two-way delay, Packet Delay [two-way], of the corresponding service packet:

Packet Delay [one-way] is a summation of a difference between a local time when the extended BFD packet is received and transmitting time (TxTimeStamp_L value) of the extended BFD packet and a time difference between a sending end and a receiving end. When a network supports strict clock synchronization, the time difference between the sending end and the receiving end is zero, and the one-way delay is equal to the difference between the local time when the extended BFD packet is received and the transmitting time of the extended BFD packet.

Packet Delay [two-way]=(RxTimea−TxTimeStamp_L)−(TxTimeStamp_F−RxTimeStamp_L), where RxTimea the local time when the extended BFD packet is received.

Formulas for calculating the foregoing near-end packet loss, far-end packet loss, one-way delay, and two-way delay have been disclosed as standards in Y.1731, which are not illustrated specifically herein.

After the one-way delay and two-way delay of the corresponding service packet are obtained by using the foregoing formulas, a corresponding one-way delay jitter and a two-way delay jitter are also obtained. Specifically, a one-way delay jitter is a difference between two one-way delay measurement results; and a two-way delay jitter is a difference between two two-way delay measurement results.

If the extended BFD packet is used as the measurement message, negotiation of a measurement period may be completed in a process of establishing a BFD session at a sending end and a receiving end. Specifically, the process includes:

The sending end sends a measurement period to be negotiated to the receiving end by sending a request packet carrying an extended TLV. When measurement periods of multiple types of service packets are negotiated together, the extended TLV may adopt a format shown in FIG. 3; while when a measurement period of each type of service packet is negotiated separately, the extended TLV may adopt a format shown in FIG. 5.

After receiving the request packet, the receiving end parses and obtains a measurement period of a service, performance of which is to be measured, and returns the measurement period to acknowledge the request by returning a reply packet to the sending end.

The two ends complete negotiation of the measurement period.

According to the embodiment of the present application, a priority of an extended BFD packet is set to a priority of a corresponding service packet, and the extended BFD packet and the service packet are identified by using a priority identification field and a tunnel identification field, and then performance measurement is performed by using one or more of a packet loss measurement TLV and a delay measurement TLV in the extended BFD packet for different services transmitted in multiple tunnels.

Embodiment 4

FIG. 6 is a schematic structural diagram of an apparatus 600 for measuring performance of multi-service according to Embodiment 4 of the present application. The apparatus includes a measurement message receiving unit 610 and a service performance measuring unit 620, where the measurement message receiving unit 610 is connected to the service performance measuring unit 620.

The measurement message receiving unit 610 is configured to receive measurement messages corresponding to service packets. A priority of a measurement messages is the same as that of corresponding service packet corresponding to the measurement message. For example, their priority identification fields may be the same. To implement performance measurement of corresponding services, the measurement message includes at least one parameter of parameters: a packet loss parameter, a delay parameter, and a jitter parameter.

To enable a measurement message to correspond to a service packet that is measured by using the measurement message, in the embodiment, various types of service packets and corresponding measurement messages are identified by using priority identification fields and Tunnel ID fields. Where priority identification fields of the service packets are the same as those of the corresponding measurement messages and Tunnel ID fields of the service packets are the same as those of the corresponding measurement messages. Because different service packets in a same tunnel may be differentiated by using a priority identification field, service packets in different tunnels may also be differentiated by combining the priority identification field and a Tunnel ID field.

The service performance measuring unit 620 is configured to measure performance of corresponding services according to the measurement messages that are received by the measurement message receiving unit 610, that is, to calculate the performance of the corresponding services according to at least one parameter of: the packet loss parameter, the delay parameter, and the jitter parameter in the measurement messages.

As an embodiment of the present application, the packet loss parameter includes transmitting count (TxPacketCounter_L), receiving count, and returning count, where transmitting count may be used to calculate near-end packet loss, and receiving count and returning count may be combined to calculate far-end packet loss. The delay parameter includes transmitting time, receiving time, and returning time, where transmitting time may be used to calculate a one-way delay and a one-way delay jitter, and transmitting time, receiving time, and returning time may be combined to calculate a two-way delay and a two-way delay jitter.

It should be noted that, when the near-end packet loss is calculated, the apparatus 600 for measuring performance of multi-service further includes a received packet counter, configured to calculate the number of preset-type packets that have been received when the measurement messages are received; and when the one-way delay, the two-way delay, the one-way delay jitter, and the two-way delay jitter are calculated, the apparatus 600 for measuring performance of multi-service further includes a local timing storage unit, configured to storage local timing when the measurement messages are received.

As an embodiment of the present application, the apparatus 600 for measuring performance of multi-service further includes a measurement period negotiating unit 630, configured to negotiate measurement periods of various types of service packets in a tunnel. For example, the measurement period negotiating unit 630 may send a negotiation message, and receive acknowledgement information returned by a peer end to determine measurement periods of various types of services in tunnels at two ends; and may also receive a negotiation message sent by the peer end, and return acknowledgement information to determine a measurement period. In this embodiment of the present application, a measurement period may also be set for the apparatus 600 for measuring performance of multi-service.

As an embodiment of the present application, a measurement message received by the measurement message receiving unit 610 is an extended bidirectional forwarding detection, BFD, packet. Using the BFD packet as the measurement message has been described in Embodiment 3, and details are not repeatedly described herein.

According to this embodiment of the present application, priorities of measurement messages are set to priorities of corresponding service packets, and the measurement messages and the service packets are identified by using priority identification fields and tunnel identification fields, and then at least one parameter of the three: a packet loss measurement parameter, a delay measurement parameter, and a jitter measurement parameter in the measurement messages is used to perform performance measurement for different services transmitted in multiple tunnels, so that a problem that performance measurement cannot be performed for different services transmitted in multiple tunnels in the prior art may be solved.

Persons of ordinary skill in the art may understand that all or part of the processes of the methods according to the embodiments may be implemented by a computer program instructing relevant hardware. The program may be stored in a computer readable storage medium. When the program is run, the processes of the methods according to the embodiments are performed. The storage medium may be a magnetic disk, an optical disk, a read-only memory (Read-Only Memory, ROM), or a random access memory (Random Access Memory, RAM), and the like.

The objectives, technical solutions, and benefits of the present application are further described in detail in the foregoing specific embodiments. It should be understood that the foregoing descriptions are only specific embodiments of the present application, but are not intended to limit the protection scope of the present application. Any modification, equivalent replacement, or improvement made without departing from the spirit and principle of the present application shall fall within the protection scope of the present application.

What is claimed is:

1. A method, where the method is applied to a tunnel and the tunnel bears a plurality of class types of service packets, the plurality of class types of service packets are differentiated through their priorities, the method comprises:
    sending, by a sending end, a first measurement message that carries request information, wherein a priority of the first measurement message is the same as a priority of a first service packet in the plurality of class types of service packets, and the first measurement message comprises a first packet loss measurement parameter;
    receiving, by the sending ending, a second measurement message that carries response information corresponding to the first measurement message, wherein a priority of the second measurement message is the same as the priority of the first measurement message and the second measurement message comprises a second packet loss measurement parameter; and
    measuring, by the sending end, packet loss performance of a first service in the tunnel according to the second packet loss measurement parameter in the second measurement message, where the first service packet belongs to the first service.

2. The method according to claim 1, wherein sending the first measurement message and receiving the second measurement message comprises:
    determining a measurement period of the first service packet in the tunnel, sending the first measurement message as required and receiving the second measurement message in the measurement period.

3. The method according to claim 2, wherein determining the measurement period of the first service packet in the tunnel comprises one of:
    receiving, by the sending end, acknowledgement information of a negotiation message, wherein the negotiation message is used to negotiate measurement periods for one or more types of service packets;
    and
    defining, by the sending end, a measurement period of the service packet before sending the first measurement message.

4. The method according to claim 3, wherein when the negotiation message comprises an extended type-length-value (TLV), a value field of the extended TLV comprises:
    a service identification field for identifying the first service; and
    a measurement period of the first service.

5. A method, where the method is applied to a plurality of tunnels and each of the plurality of tunnel bears a plurality of class types of service packets, the plurality of class types of service packets in one of the plurality of tunnels are differentiated through their priorities, and the plurality of tunnels are differentiated through their tunnel identifiers, the method comprises:
    sending, by a sending end, a first measurement message that carries request information, wherein a priority of the first measurement message is the same as a priority of a first service packet in the plurality of class types of service packets, and a tunnel identifier of the first measurement message is the same as a tunnel identifier of the first service packet, and the first measurement message comprises a first packet loss measurement parameter;
    receiving, by the sending end, a second measurement message that carries response information corresponding to the first measurement message, wherein a priority of the second measurement message is the same as a priority of the first measurement message, and a tunnel identifier of the second measurement message is the same as a tunnel identifier of the first measurement message, the second measurement message comprises a second packet loss measurement parameter; and
    measuring, by the sending end, packet loss performance of a first service in the tunnel according to the second packet loss measurement parameter in the second measurement message, where the first service packet belongs to the first service.

6. The method according to claim 5, wherein the first measurement message comprises
    a priority identification field indicating the priority of the first measurement message,
    and
    a tunnel identification field indicating the tunnel identifier of the first measurement message; and
    the second measurement message comprises:
    a priority identification field indicating the priority of the second measurement message,
    and
    a tunnel identification field indicating the tunnel identifier of the second measurement message.

7. The method according to claim 6, wherein the priority identification field is one of:
    a traffic class (TC) field of a Multi-Protocol Label Switching (MPLS) tunnel,
    and
    a differentiated services code point (DSCP) field of an internet protocol (IP) tunnel.

8. The method according to claim 5, wherein sending the first measurement message and receiving the second measurement message comprises:
    determining a measurement period of the first service packet in the tunnel, sending the first measurement message as required and receiving the second measurement message in the measurement period.

9. An apparatus, where the apparatus is arranged on one end of a tunnel and the tunnel bears a plurality of class types of service packets, the plurality of class types of service packets are differentiated through their priorities, the apparatus comprises a non-transitory computer-readable storage medium storing program be executed by a computer, the program including instructions for:

sending a first measurement message that carries request information, wherein a priority of the first measurement message is the same as a priority of a first service packet in the plurality of class types of service packets, and the first measurement message comprises a first packet loss measurement parameter;

receiving a second measurement message that carries response information corresponding to the first measurement message from the other end of the tunnel, wherein a priority of the second measurement message is the same as the priority of the first measurement message, and the second measurement message comprises a second packet loss measurement parameter; and measuring packet loss performance of a first service in the tunnel according to the second packet loss measurement parameter in the second measurement message, where the first service packet belongs to the first service.

10. An apparatus, where the apparatus is arranged on one end of a plurality of tunnels and each of the plurality of tunnel bears a plurality of class types of service packets, the plurality of class types of service packets in one of the plurality of tunnels are differentiated through their priorities, and the plurality of tunnels are differentiated through their tunnel identifiers, the apparatus comprises a non-transitory computer-readable storage medium storing program be executed by a computer, the program including instructions for:

sending a first measurement message that carries request information, wherein a priority of the first measurement message is the same as a priority of a first service packet in the plurality of class types of service packets, a tunnel identifier of the first measurement message is the same as a tunnel identifier of the first service packet, and the first measurement message comprises a first packet loss measurement parameter;

receiving a second measurement message that carries response information corresponding to the first measurement message, wherein a priority of the second measurement message is the same as the priority of the first service measurement message, a tunnel identifier of the second measurement message is the same as the tunnel identifier of the first measurement message, and the second measurement message comprises a second packet loss measurement parameter; and measuring packet loss performance of a first service in the tunnel according to the second packet loss measurement parameter in the second measurement message, where the first service packet belongs to the first service.

* * * * *